(12) United States Patent
Corbett

(10) Patent No.: US 8,762,416 B1
(45) Date of Patent: *Jun. 24, 2014

(54) SYSTEM AND METHOD FOR SPECIFYING BATCH EXECUTION ORDERING OF REQUESTS IN A STORAGE SYSTEM CLUSTER

(75) Inventor: Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 833 days.

This patent is subject to a terminal disclaimer.

(21) Appl. No.: 12/637,926

(22) Filed: Dec. 15, 2009

Related U.S. Application Data

(63) Continuation of application No. 11/119,166, filed on Apr. 29, 2005, now Pat. No. 7,657,537.

(51) Int. Cl.
*G06F 7/00* (2006.01)
*G06F 17/30* (2006.01)

(52) U.S. Cl.
USPC ............ 707/796; 709/225; 709/226; 711/111

(58) Field of Classification Search
USPC ................... 707/796; 709/225, 226; 711/111
See application file for complete search history.

(56) References Cited

U.S. PATENT DOCUMENTS

| | | | |
|---|---|---|---|
| 5,644,786 A * | 7/1997 | Gallagher et al. | 710/30 |
| 5,648,957 A | 7/1997 | Lee et al. | |
| 5,742,361 A | 4/1998 | Nakase et al. | |
| 5,805,839 A | 9/1998 | Singhal | |
| 5,870,760 A * | 2/1999 | Demers et al. | 1/1 |
| 5,974,465 A | 10/1999 | Wong | |
| 6,098,149 A * | 8/2000 | Ofer et al. | 711/112 |
| 6,160,808 A | 12/2000 | Maurya | |
| 6,334,159 B1 * | 12/2001 | Haupt | 710/6 |
| 6,392,993 B1 * | 5/2002 | Hamilton et al. | 370/230 |
| 6,522,635 B1 | 2/2003 | Bedwell | |
| 6,580,723 B1 | 6/2003 | Chapman | |
| 6,671,773 B2 * | 12/2003 | Kazar et al. | 711/112 |
| 6,721,286 B1 | 4/2004 | Williams et al. | |

(Continued)

FOREIGN PATENT DOCUMENTS

| | | |
|---|---|---|
| JP | 10003440 A | 6/1998 |
| WO | WO 00/07101 A1 | 2/2000 |

OTHER PUBLICATIONS

"Single machine batch scheduling with deadlines and resource dependent processinttimes", Operation Research Letters 17, 243-249, 1995.*

(Continued)

*Primary Examiner* — Shew-Fen Lin
(74) *Attorney, Agent, or Firm* — Cesari and McKenna, LLP

(57) ABSTRACT

A method for operating a computer data storage system is described. A plurality of requests are received from a client, each request of the plurality of requests having assigned a unique sequence number, each request being an input/output request to a data storage device. The plurality of requests is divided into a plurality of subsets of requests. A unique batch number is assigned to each subset of requests so that each subset of requests is assigned a unique batch number. A first subset of requests having a first batch number is executed in arbitrary order with respect to the sequence number of each request. A second subset of requests is executed in response to a second batch number after execution of all of the first subset of requests has completed.

19 Claims, 11 Drawing Sheets

(56) References Cited

U.S. PATENT DOCUMENTS

| | | |
|---|---|---|
| 6,751,663 B1 | 6/2004 | Farrell et al. |
| 6,757,255 B1 | 6/2004 | Aoki et al. |
| 6,957,281 B2 | 10/2005 | Mann et al. |
| 6,983,334 B2 | 1/2006 | Riedle |
| 7,061,927 B2 | 6/2006 | Panigrahy et al. |
| 7,076,555 B1 | 7/2006 | Orman et al. |
| 7,079,525 B1 * | 7/2006 | Goldstein et al. ............ 370/352 |
| 7,149,817 B2 * | 12/2006 | Pettey ........................... 709/250 |
| 7,313,614 B2 * | 12/2007 | Considine et al. ............ 709/223 |
| 7,325,082 B1 * | 1/2008 | Schibinger et al. ........... 710/111 |
| 7,404,000 B2 * | 7/2008 | Lolayekar et al. ............ 709/230 |
| 7,443,872 B1 | 10/2008 | Corbett et al. |
| 7,660,310 B1 * | 2/2010 | Joshi ............................. 370/394 |
| 7,756,852 B2 * | 7/2010 | Sethi et al. .................... 707/713 |
| 2002/0016851 A1 | 2/2002 | Border |
| 2002/0018468 A1 * | 2/2002 | Nishihara ..................... 370/389 |
| 2002/0091844 A1 | 7/2002 | Craft et al. |
| 2003/0014544 A1 * | 1/2003 | Pettey ........................... 709/249 |
| 2003/0051037 A1 | 3/2003 | Sundaram et al. |
| 2003/0088667 A1 | 5/2003 | Riedle |
| 2003/0115357 A1 | 6/2003 | Chu et al. |
| 2003/0210686 A1 * | 11/2003 | Terrell et al. ................. 370/389 |
| 2004/0001511 A1 | 1/2004 | Matta |
| 2004/0010545 A1 | 1/2004 | Pandya |
| 2004/0139167 A1 | 7/2004 | Edsall et al. |
| 2004/0243703 A1 | 12/2004 | Demmer et al. |
| 2005/0015471 A1 | 1/2005 | Zhang et al. |
| 2005/0165802 A1 * | 7/2005 | Sethi et al. .................... 707/100 |
| 2005/0237998 A1 | 10/2005 | Okuda et al. |
| 2006/0133379 A1 | 6/2006 | Krishnan et al. |

OTHER PUBLICATIONS

Stevens, W. Richard. TCP/IP Illustrated, vol. 1 The Protocols. Chapter 20, pp. 275-296, 1994, Addison Wesley Longman, Inc. Reading, MA.

Tanenbaum, Andrew S., Computer Networks, Third Ed., pp. 533-536, Prentice Hall, Inc., Upper Saddle River, NJ, USA 1996.

ANSI, American National Standard, INCITS 230-1994 (R1999), X3.230-1994 (R 1999), Nov. 14, 1994, p. i-ii, 345, 351, 362.

Li et al., Fast knockout algorithm for self-route concentration, Oct. 1999, pp. 1574-1584.

McKenzie, "A Problem with the TCP Big Window Option", Aug. 1989, Request for Comments (RFC) 1110, Network Working Group, pp. 1-3.

Batcher, "Sorting Networks and Their Applications", Apr. 1968, Proceedings of the AFIPS Joint Computing Conference, pp. 307-314.

Clark et al., "NETBLT: A Bulk Data Transfer Protocol", Mar. 1987, Request for Comments (RFC) 969, Network Working Group, pp. 1-21.

Fox, "TCP Big Window and Nak Options", Jun. 1989, Request for Comments (RFC) 1106, Network Working Group, pp. 1-13.

\* cited by examiner

SYSTEM AND METHOD FOR SPECIFYING BATCH EXECUTION ORDERING OF REQUESTS IN A STORAGE SYSTEM CLUSTER

CROSS-REFERENCE TO RELATED APPLICATION

The present application is a continuation of U.S. patent application Ser. No. 11/119,166, titled SYSTEM AND METHOD FOR SPECIFYING BATCH EXECUTION ORDERING OF REQUESTS IN A STORAGE SYSTEM CLUSTER, by Peter F. Corbett, filed on Apr. 29, 2005, now issued as U.S. Pat. No. 7,657,537 on Feb. 2, 2010, which is related to U.S. Pat. No. 7,443,872, entitled SYSTEM AND METHOD FOR MULTIPLEXING CHANNELS OVER MULTIPLE CONNECTIONS IN A STORAGE SYSTEM CLUSTER. Both patents are hereby incorporated by reference.

FIELD OF THE INVENTION

The present invention is directed to network protocols and, in particular, to ordering of message operation execution in accordance with a network protocol executing on a storage system cluster.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system cluster configured to service many clients. Each storage system or node may be configured to service one or more volumes, wherein each volume stores one or more data containers. Communication among the nodes involves the exchange of information between two or more entities interconnected by communication links. These entities are typically is software programs executing on the nodes. The nodes communicate by exchanging discrete packets or messages of information according to predefined protocols. In this context, a protocol consists of a set of rules defining how the nodes interact with each other.

Each node generally provides its services through the execution of software modules, such as processes. A process is a software program that is defined by a memory address space. For example, an operating system of the node may be implemented as a single process with a large memory address space, wherein pieces of code within the process provide operating system services, such as process management. Yet, the node's services may also be implemented as separately-scheduled processes in distinct, protected address spaces. These separate processes, each with its own process address space, execute on the node to manage resources internal to the node and, in the case of a database or network protocol, to interact with various network entities.

Services that are part of the same process address space communicate by accessing the same memory space. That is, information exchanged between services implemented in the same process address space is not transferred, but rather may be accessed in a common memory. However, communication among services that are implemented as separate processes is typically effected by the exchange of messages. For example, information exchanged between different addresses spaces of processes is transferred as one or messages between different memory spaces of the processes. A known message-passing mechanism provided by an operating system to transfer information between process address spaces is the Inter Process Communication (IPC) mechanism.

Resources internal to the node may include communication resources that enable a process on one node to communicate over the communication links or network with another process on a different node. The communication resources include the allocation of memory and data structures, such as messages, as well as a network protocol stack.

The network protocol stack, in turn, comprises layers of software, such as a session layer, a transport layer and a network layer. The Internet protocol (IP) is a network layer protocol that provides network addressing between nodes, whereas the transport layer provides a port service that identifies each process executing on the nodes and creates a connection is between those processes that indicate a willingness to communicate. Examples of conventional transport layer protocols include the reliable connection (RC) protocol and the Transmission Control Protocol (TCP).

Broadly stated, the connection provided by the transport layer, such as that provided by TCP, is a reliable, securable logical circuit between pairs of processes. A TCP process executing on each node establishes the TCP connection in accordance with a conventional "3-way handshake" arrangement involving the exchange of TCP message or segment data structures. The resulting TCP connection is identified by port numbers and IP addresses of the nodes. The TCP transport service provides reliable delivery of a message using a TCP transport header. The TCP protocol and establishment of a TCP connection are described in *Computer Networks, 3rd Edition*, particularly at pgs. 521-542, which is hereby incorporated by reference as though fully set forth herein.

Flow control is a protocol function that controls the flow of data between network protocol stack layers in communicating nodes. At the transport layer, for example, flow control restricts the flow of data (e.g., bytes) over a connection between the nodes. The transport layer may employ a fixed sliding-window mechanism that specifies the number of bytes that can be exchanged over the network (communication link) before acknowledgement is required. Typically, the mechanism includes a fixed sized window or buffer that stores the data bytes and that is advanced by the acknowledgements.

The session layer manages the establishment or binding of an association between two communicating processes in the nodes. In this context, the association is a session comprising a series of interactions between the two communicating processes for a period of time, e.g., during the span of a connection. Upon establishment of the connection, the processes take turn exchanging commands and data over the session, typically through the use of request and response messages. Flow control in the session layer concerns the number of outstanding request messages (requests) that is allowed over the session at a time. Laggard response messages (responses) or long-running requests may force the institution of session layer flow control to limit the flow of requests between the processes, thereby adversely impacting the session.

A solution that enables a session to continue to perform at high throughput even in the event of a long-running request or a lost request or response is described in the above-referenced U.S. Pat. No. 7,443,872 entitled SYSTEM AND METHOD FOR MULTIPLEXING CHANNELS OVER MULTIPLE CONNECTIONS IN A STORAGE SYSTEM CLUSTER. Here, a network protocol employs multiple request channels within a session to allow high levels of concurrency, i.e., to allow a large number of requests to be outstanding within each channel. Multiple channels further allow a plurality of sessions to be multiplexed over the connections to thereby insulate the sessions from lost throughput due to laggard responses or long-running requests.

Broadly stated, each channel is embodied as a request window that stores outstanding requests sent over the connection. Each request window has a predetermined initial sequence window size and the total number of outstanding requests in a session is the sum of the window sizes of all the channels in the session. In addition, each request has a sequence number that is unique for that request and specifies its sequence in the channel. Coupling the sequence number with a defined sequence window size provides flow and congestion control, limiting the number of outstanding requests in the channel. However, if the sequence number is also used to specify an order of execution of requests, then no requests can be executed out-of-order or concurrently within the channel. Requests on different channels can be executed concurrently or out-of-order respect to each other, but there is no way to enforce an ordering of the requests in different channels with respect to each other. It is desirable to be able to specify that a number of requests can be executed in arbitrary order, but then occasionally insert a barrier that requires that all requests up to a certain point must be executed before any request after that point. Additionally, it is desirable to specify an exact order of execution, while occasionally allowing out of order execution or, alternately, to permit any intermediate degree of control from completely ordered execution to completely arbitrary execution ordering.

SUMMARY OF THE INVENTION

The present invention overcomes the disadvantages of the prior art by providing a system and method for specifying batch execution ordering of requests in a cluster of is storage systems or nodes. Each node is generally organized as a network element and a disk element. Each element includes a cluster fabric interface module adapted to implement a network protocol, which integrates a session infrastructure and an application operation set into a session layer. The network protocol is illustratively a request/response protocol wherein an element (requester) receiving a data access request from a client redirects that request to another element (responder) that services the request and, upon completion, returns a response.

In the illustrative embodiment, the session layer manages the establishment and termination of sessions between requesters/responders in the cluster and is built upon a connection layer that establishes connections between the requesters/responders. Each session comprises a plurality of channels disposed over the connections, wherein each channel enables multiple requests to be sent over a connection. Each request is identified by a unique identifier ("request id") that is generally defined as the combination of a channel number and a sequence number. To that end, each channel is identified by a channel number, which is unique within the direction of request flow in the session. In addition, each request has a sequence number that is unique for that request and specifies its sequence in the channel.

According to an aspect of the invention, the request id is extended to include a batch number that provides an execution ordering directive within a channel. That is, each request is also assigned a batch number used to impose ordering of the request within the channel. All requests with the same batch number in a channel can be executed in arbitrary order or concurrently by the responder. Ordering is imposed only when the batch number changes, e.g., increases. Illustratively, the batch number increases monotonically with increasing sequence number. Although more than one request in a channel can have the same batch number, all requests with the same batch number are executed before any request with a higher batch number.

Advantageously, batch execution ordering allows multiple requests to be executed concurrently or out of sequence, while explicitly requiring ordering among subsets of requests. That is, the use of batch numbers within a channel allows imposition of an ordering constraint on requests in the channel, as well as issuance of multiple unordered requests in the channel. Moreover, layering of a batch number on a request id allows immediate and certain detection of a boundary between batches with no danger of error. In other words, the batch number enables a responder to determine whether a request can be immediately executed or must be stalled, and this determination can always be made optimally based on other requests received at that point.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
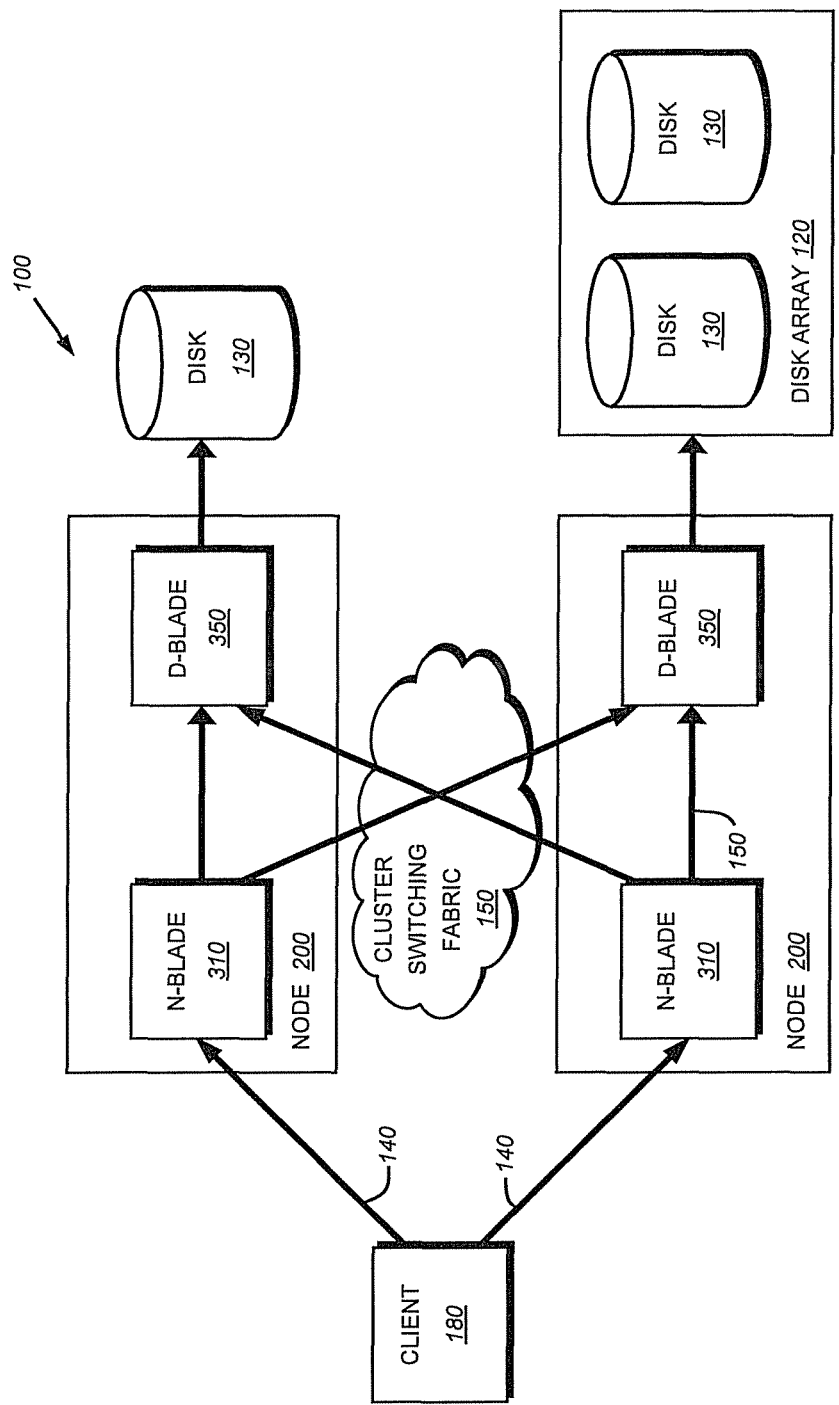
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al., issued Dec. 30, 2003. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
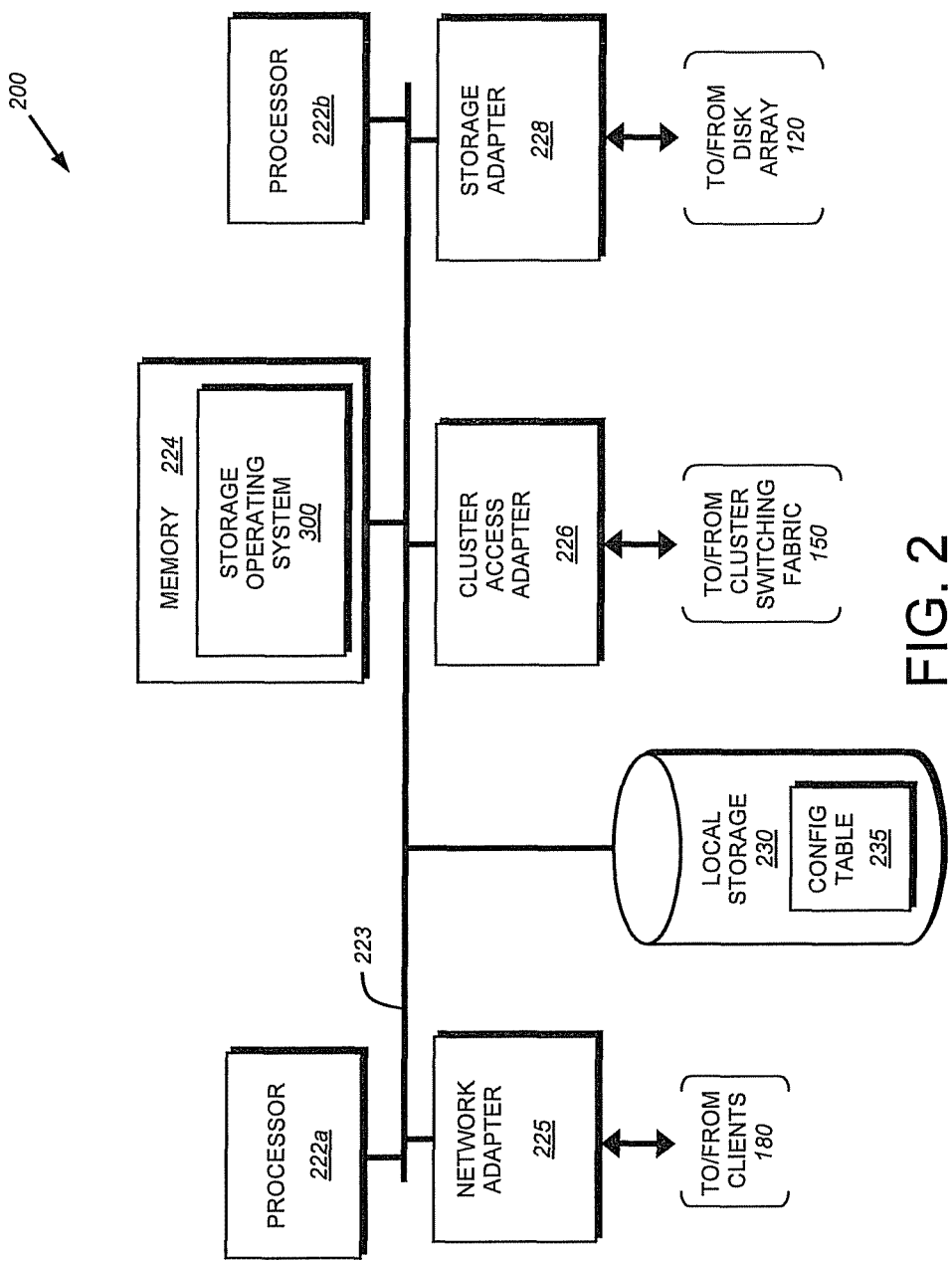
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
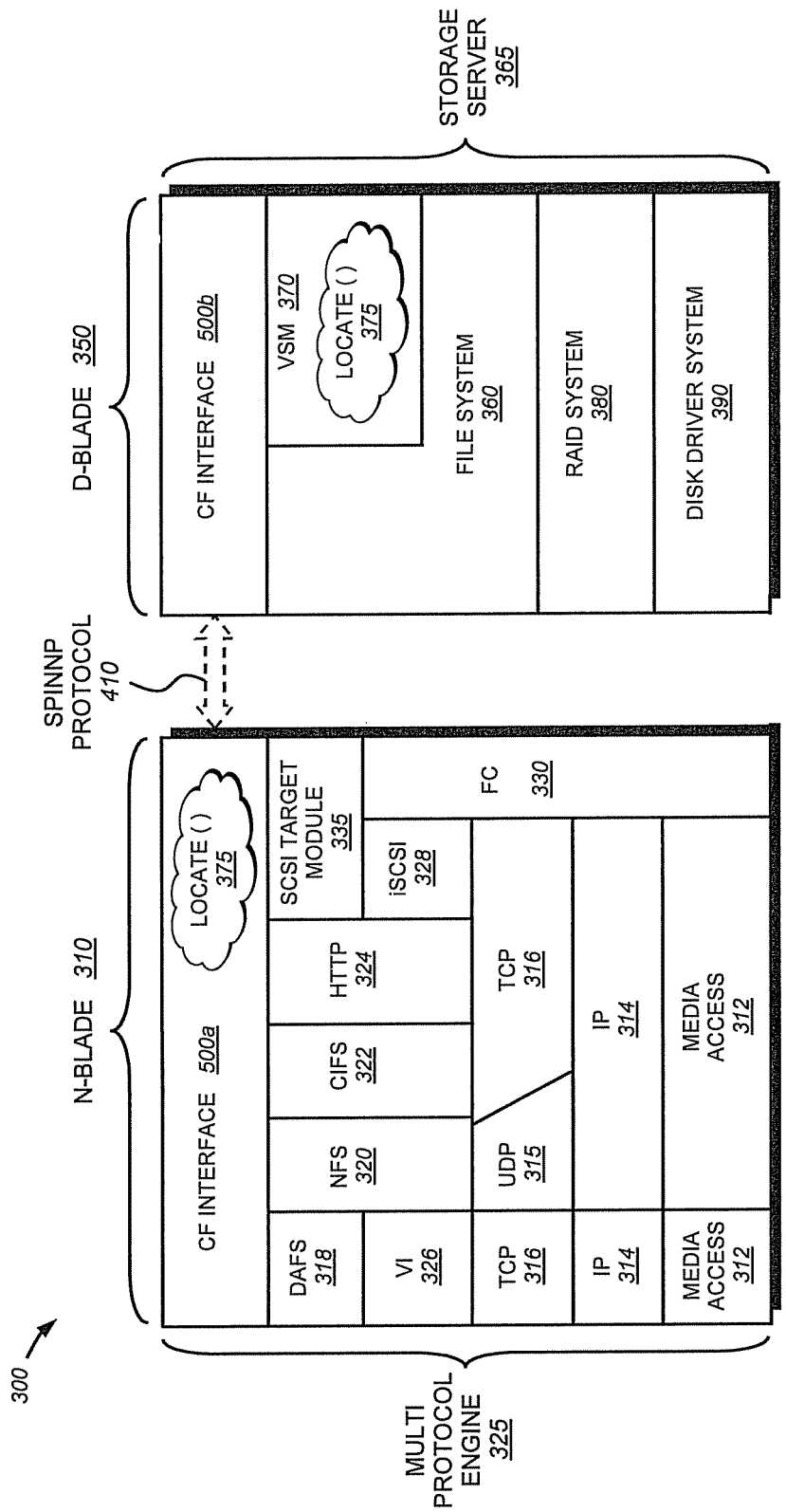
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) and cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disco posed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the stores age devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as minoring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

D. SpinNP Network Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 500*a,b* adapted to implement a network protocol that enables intra-cluster communication among the blades, as described herein.

The protocol layers, e.g., the NFS/CIFS layers and the iSCSI/FC layers, of the N-blade 310 function as protocol servers that translate file-based and block based data access requests from clients into network protocol messages used for communication with the D-blade 350. That is, the N-blade servers convert the incoming data access requests into primitive operations (commands) that are embedded within messages by the CF interface module 500 for transmission to the D-blades 350 of the cluster 100. Notably, the CF interface modules 500 cooperate to provide a single file system image across all D-blades 350 in the cluster 100. Thus, any network port of an N-blade that receives a client is request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism.

The network protocol illustratively described herein is the Spin network protocol (SpinNP) that comprises a collection of methods/functions constituting a SpinNP application programming interface (API). SpinNP is a proprietary protocol of Network Appliance of Sunnyvale, Calif. The term SpinNP is used herein without derogation of any trademark rights of Network Appliance, Inc. The SpinNP API, in this context, is a set of software calls and routines that are made available (exported) by a process and that can be referenced by other processes. As described herein, all SpinNP protocol communication in the cluster occurs via connections. Communication is illustratively effected by the D-blade exposing the SpinNP API to which an N-blade (or another D-blade) issues calls. To that end, the CF interface module 500 is organized as a CF encoder and CF decoder. The CF encoder of, e.g., CF interface 500a on N-blade 310 encapsulates a SpinNP message as (i) a local procedure call (LPC) when communicating a command to a D-blade 350 residing on the same node 200 or (ii) a remote procedure call (RPC) when communicating the command to a D-blade residing on a remote node of the cluster 100. In either case, the CF decoder of CF interface 500b on D-blade 350 de-encapsulates the SpinNP message and processes the command.

Figure 4:
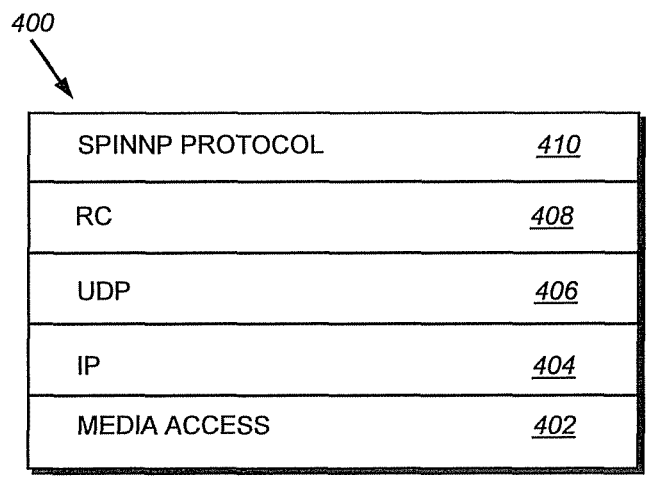
FIG. 4 is a schematic block diagram illustrating the format of a SpinNP message in accordance with an embodiment of with the present invention.

FIG. 4 is a schematic block diagram illustrating the format of a SpinNP message 400 in accordance with an embodiment of with the present invention. The SpinNP mesas sage 400 is illustratively used for RPC communication over the switching fabric 150 between remote blades of the cluster 100; however, it should be understood that the term "SpinNP message" may be used generally to refer to LPC and RPC communication between blades of the cluster. The SpinNP message 400 includes a media access layer 402, an IP layer 404, a UDP layer 406, a reliable transport layer, such as a reliable connection (RC) layer 408, and a SpinNP protocol layer 410. As noted, the SpinNP protocol conveys commands related to operations contained within, e.g., client requests to access data containers stored on the cluster 100; the SpinNP protocol layer 410 is that portion of message 400 that carries those commands. Illustratively, the SpinNP protocol is datagram based and, as such, involves transmission of messages or "envelopes" in a reliable manner from a sender (e.g., an N-blade 310) to a receiver (e.g., a D-blade 350). The RC layer 408 implements a reliable transport protocol that is adapted to process such envelopes in accordance with a connectionless protocol, such as UDP 406.

According to the invention, the SpinNP network protocol is a multi-layered protocol that integrates a session infrastructure and an application operation set into a session layer that obviates encapsulation and buffering overhead typically associated with protocol layering. The session layer manages the establishment and termination of sessions between blades in the cluster and is illustratively built upon a connection layer that defines a set of functionality or services provided by a connection-oriented protocol. The connection-oriented protocol may include a framing protocol layer over a network transport, such as RC and/or TCP, or a memory-based IPC protocol. These connections are formed via the network transport, or via the local memory-to-memory or adapter-to-memory transport, and provide a packet/message transport service with flow control. It should be noted that other connection-oriented protocols, perhaps over other transports, can be used, as long as those transports provide the same minimum guaranteed functionality, e.g., reliable message delivery.

Figure 5:
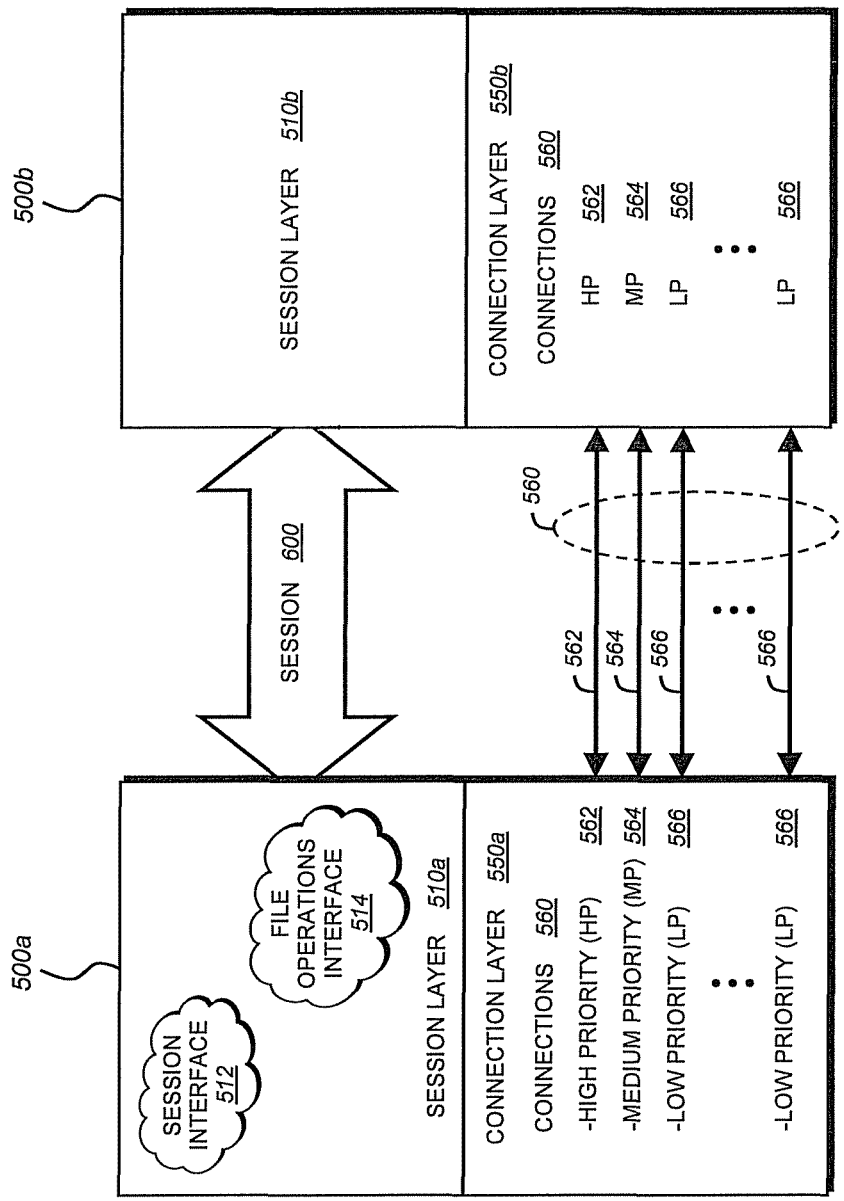
FIG. 5 is a schematic block diagram illustrating the organization of cluster fabric interface modules adapted to implement a SpinNP protocol in accordance with an embodiment of the present invention.

The SpinNP network protocol is illustratively a request/response protocol wherein a blade (requester) receiving a data access request from a client redirects that request to another blade (responder) that services the request and, upon completion, returns a response. The network protocol is illustratively implemented by the CF interface modules 500 and, as such, a SpinNP session provides a context for uni-directional flow of request messages (requests) and uni-directional flow of corresponding response messages (responses) to those requests. Each request consists of one SpinNP message and generates one response, unless the connection is lost or the session terminates abnormally. FIG. 5 is a schematic block diagram illustrating the organization of the CF interface modules 500a,b adapted to implement the SpinNP protocol in accordance with an embodiment of the present invention. Each module 500a,b comprises a SpinNP session layer 510a,b and a connection layer 550a,b.

The SpinNP session layer 510 allows implementation of different operation protocols, hereinafter referred to generally as "operation interfaces". Examples of such interfaces include a session interface 512 that defines a set of protocol operations that is used to provide the session infrastructure and a file operations interface 514 that defines file access operations that are generally translated requests coming from external clients. Other interfaces implemented by the session layer include those used by data management, system management or other "application" subsets of cluster functionality, as needed. Notably, the session infrastructure operations exist in the network protocol at the same level of encapsulation as the application operations to enable an efficient and highly functional implementation. All interfaces share common features of the session layer, including credentials, authentication, verification, sessions, recovery, and response caches. Each operation provided by an interface is illustratively defined by an interface number coupled with a procedure number.

As noted, the SpinNP network protocol 410 relies on connections for reliable message delivery. As such, a session 600 is disposed over one or more connections 560 and is illustratively established between a pair of blades or other participants. For example, a session can be established between D-blades, between an N-blade and a D-blade, and between N-blades (if there proves to be a need for N-blade-to-N-blade SpinNP calls). The session can also be used to inter-connect other entities or agents, including user-space processes and services, to blades or to each other. Each pair of blades typically requires only one session to communicate; however, multiple sessions can be opened simultaneously between the same pair of blades. Each session requires bi-directional request flow over the same connection. The session 600 also provides an infrastructure that makes messages secure and supports recovery without requiring an additional protocol layer between the network transport layer (RC or TCP) and the application layer (e.g., file access operations). Each session is independently negotiated and initiated to thereby enable a high level of message concurrency and asynchrony.

The connections 560 are established by the connection layers 510a,b and provide the network transport for the sessions between the blades. At least one connection is required for each session, wherein the connection is used for both requests and responses. Although more than one connection can be bound to a session, only connections that are bound to the session can be used to carry the requests and responses for that session. The connections 560 are bi-directional, allowing message flow in each direction. For example, requests flow in both directions on each session, thereby allowing forward (operational) and reverse (callback) flows to be sent through the same session. Responses for both directions of request flow are also carried in the session. Connections that are bound to sessions cannot be shared by multiple sessions; however, multiple sessions may be multiplexed onto a single connection. That is, operational and callback sessions between an N-blade/D-blade pair can be multiplexed onto a single connection. Sessions can also multiplex operations for different clients and different users.

Each session 600 is illustratively identified by a globally unique identifier (id) formed of the universal unique ids (UUIDs) of its two participant blades, with the session initiator's UUID listed first. The globally unique id is combined with a 64-bit uniquifier that is unique for all concurrent sessions between the pair of blades, regardless of which blade is the initiator, as well as for any dormant recoverable session for which any state is still stored on either of the two blades. The uniquifier may be generated using the current time, indicating the time of constructing a session initiation operation, i.e., SPINNP_CREATE_SESSION, conveyed within an appropriate request. The resulting session id uniquifier is then confirmed by the receiver blade. Note that the id uniquifier should be unique unless both blades are trying to create a session to each other simultaneously. If so, each blade can counter-propose a different session id, possibly by simply adding a small random number to the original proposed session id uniquifier.

In the illustrative embodiment, each connection 560 has an assigned priority level and each session 600 is bound to at least three connections, each of which is independently flow-controlled and has a different priority level. Illustratively, the connections include a high priority level connection 562, a medium priority level connection 564 and a low priority connection level 566. The priority level indicates the minimum priority of message that the connection will accept. To that end, each request has one of the three priority levels: high, medium and low. Every response is sent with the same priority as its request. Low priority is used for the vast majority of requests and, as such, each session may include multiple low priority connections 566. Medium priority is used for some callback requests. Callback requests are requests that flow in the reverse of the typical direction, e.g., from server to client. The medium priority callback requests are those requests that are issued to inform the client that it must take some action that will allow the server to free some resources or unblock a different client. Finally, high priority is reserved for requests that the client issues to fulfill the demands of a callback. SpinNP session operations can be performed at any priority.

E. SpinNP Channels

Figure 6:
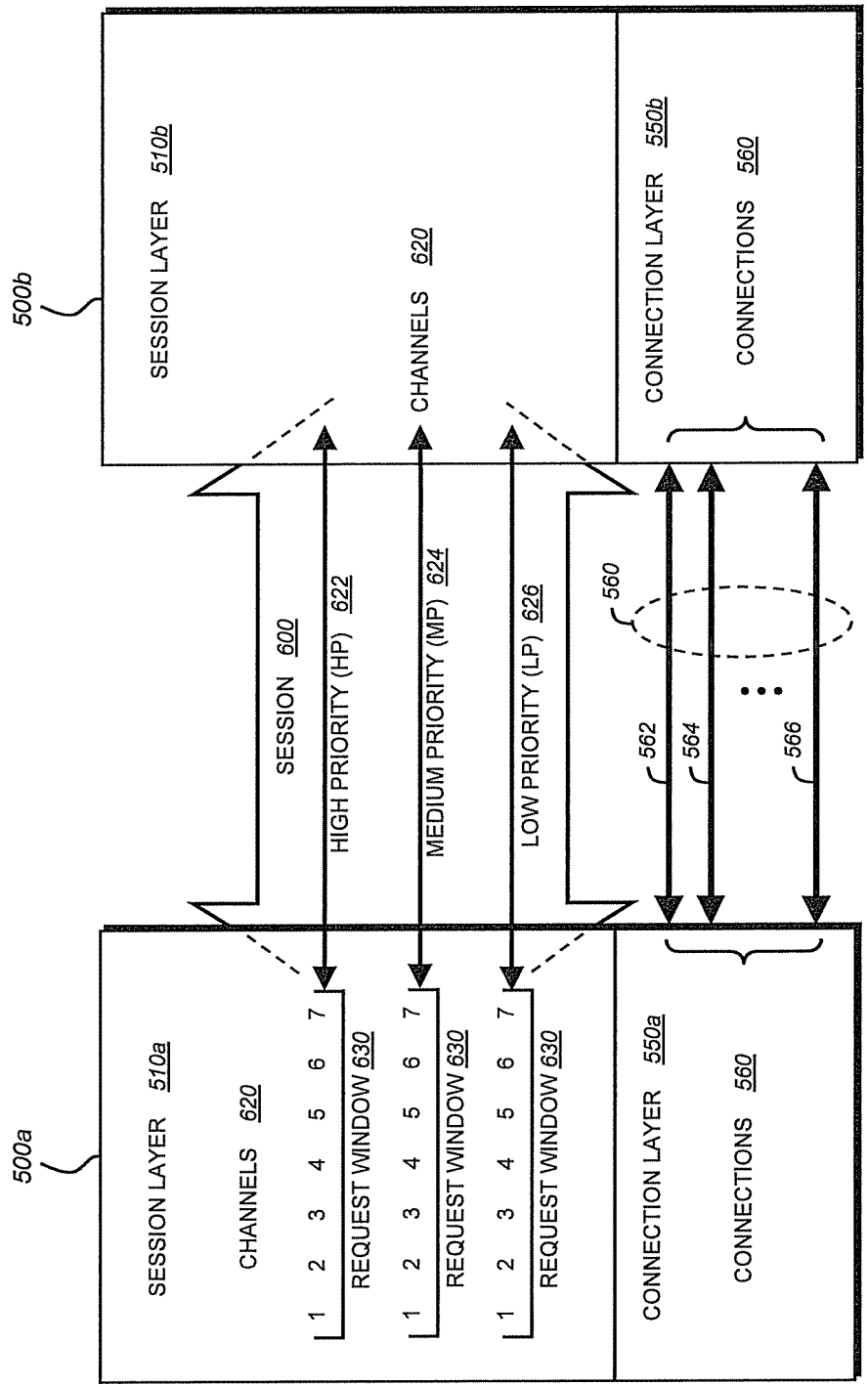
FIG. 6 is a schematic block diagram illustrating channels of a session in accordance with an embodiment the present invention.

Each session comprises a plurality of channels disposed over the connections that, unlike a session, are not bound to the channels. FIG. 6 is a schematic block diagram illustrating channels 620 of a session 600 in accordance with an embodiment of the present invention. A channel 620 is a light-weight construct that enables multiple requests to be sent asynchronously over a connection 560. Each channel 620 is illustratively embodied as a request buffer (request window 630) capable of storing a plurality of in-flight requests. Within a session, the session layer 510 selects any request window 630 with available space to send a request, thereby obviating the possibility of one long-running or lost request (or response) blocking the progress (performance) of the session. Each request window 630 has a predetermined initial sequence window size and the total number of outstanding requests in a session is the sum of the window sizes of all the channels in the session.

Moreover, each channel 620 has an assigned priority level, e.g., high priority channel 622, medium priority channel 624 and low priority channel 626. Although this arrangement imposes a binding between channels and connections of a particular priority level, the requests for any number of channels at that priority level can be sent over any set of connections used to service that priority level. That is, any request from a channel 620 that is staged in a request window 630 can be sent over any connection 560, as long as the priority levels of the request, channel and connection are the same. Although a request is associated with a channel 620 of the session layer 510, this notion disappears at the connection layer 550 (and connections 560).

Notably, there is no mapping between channels and connections; e.g., requests within a channel 620 may be distributed among (sent over) different connections 560 of the same priority, primarily because the session layer 510 performs its own matching of request to response messages within various sessions. This aspect of the invention enables the SpinNP session layer 510 to multiplex (i.e., send) requests from channels 620 (request windows 630) over any connection 560 that is available at the proper priority level. Any messages delivered over a channel can be annotated at the receiver with the priority level, which can speed the processing of higher priority messages through the layers of processing at the receiver. Note that certain numbers of connections are always kept clear of low priority traffic to keep higher priority traffic from being delayed unnecessarily by low priority traffic; however, any connection can, in theory, carry any priority of request. It should be noted that a message sent over a channel of a given priority may be sent over any connection of that specified priority or lower. Thus, a message sent over a high priority channel may utilize a low, medium or high priority connection.

Each session 600 illustratively contains a limited number of channels 620, defined during session negotiation. Initially, each channel 620 is opened with a sequence window size of one; however, the window size for any channel can be subsequently negotiated via a SPINNP_SET_SEQ_WINDOW_SIZE operation. The total number of outstanding requests in a session is the sum of the window sizes of all the channels in the session. This total is also negotiated at session creation and can be renegotiated at any time. Every time a channel's sequence window is resized, the new window size is counted against the total budget available to the session.

Each channel 620 is identified by a channel number, which is unique within the direction of request flow in the session. In addition, each request has a sequence number that is guaranteed to be unique for that request and that specifies its sequence in the channel. Illustratively, the unique sequence number of each request is one greater than the sequence number of the request that immediately precedes it in the channel. In alternate embodiments, the sequence number may be decremented from the sequence number immediately preceding it. The use of unique sequence numbers for requests prevents reexecution of replayed or duplicated requests, and allows the detection of lost requests in a session. Sequence numbers in each channel wrap-around when the maximum sequence number is reached. The requester is generally required to issue all requests in a channel in strictly increasing order until wrap-around, without skipping any sequence numbers. At wrap-around, the sequence decreases from its maximum value to zero, then resumes its strictly increasing pattern, e.g., $S(n)=n \bmod 2^{64}$, where $S(n)$ is the sequence number of the nth request sent on the channel.

Moreover, each request is identified by a unique identifier ("request id"), which is placed in a request header of the request message. A request id is generally defined as the combination of a channel number and a sequence number. Each response includes the request id of its corresponding request in a response header of the response message. Requests are otherwise distinguished from responses by a protocol tag byte in the message header, so that each message in a session is guaranteed to be unique. Note that the session layer 510 does not depend upon ordering or identifying properties of the connections 560 to resolve the association of a request to a channel 620, or its sequence in that channel.

Windowing is used within each channel 620 to accomplish flow control, bounding the maximum number of outstanding requests per channel, and therefore the total maximum number of outstanding requests per session. Request windowing is defined by the combination of a per request sequence number and a sequence window maintained on the responder. Only requests that fall within the current window of the request channel are accepted for processing by the responder. Any requests outside of the current window are failed promptly with a SPINNP_ERR_BADSEQ response. The window of requests initially accepted starts at sequence number 0 and extends to the sequence number equal to that channel's sequence window size w minus 1. The window on the responder is only advanced when the responder sends the response to the oldest outstanding request (the one with the lowest sequence number). The window of sequence numbers that the requester is allowed to send is correspondingly advanced when it receives the response to the oldest outstanding request. The requester can then advance the window by the number of contiguously numbered responses that it has received at the tail of the window in that channel.

In other words, the responder advances the window of requests it will accept in a channel when it sends a response for the oldest outstanding request in the window. At any time, the maximum sequence number that can be accepted in a channel equals the lowest sequence number of any request that has not been responded to, plus w−1. The requester can send a request with sequence number $(n+w) \bmod 2^{64}$ when it receives the response for the request with sequence number n. Note that the sequence window affects the size of a response cache, if such a cache is kept. Response cache entries are preserved in the response cache until the responder receives confirmation that a response has been received. This confirmation is received implicitly for the request with sequence number n when the request with sequence number n+w is received, where w is the window size.

Connections 560 can also be unbound from a session 600, which is generally performed during the process of closing a connection. Unbinding a connection from a session ensures that the connection is flushed of all outstanding requests and responses. All but one connection can be unbound from a session at a time without destroying the session to which it is bound. Unbinding the connection from a session does not cause the termination of the session. An abandoned session will eventually time itself out and terminate. However, a session that is reconnected before the timeout period expires does not lose its session state or identity. A connection can buffer and queue requests and responses, but it is expected to deliver complete messages to a SpinNP target as quickly as possible.

Specifically, a session 600 is closed by a SPINNP_CLOSE_SESSION operation, which also unbinds the last connection in the session. Individual connections can be disassociated from a session by a SPINNP_UNBIND_CONNECTION operation. Session termination unbinds all connections in the session. Safe termination of a session requires that all requests in the connections are delivered, and all the matching responses are received before the connections are unbound. Immediate termination of a session unbinds the connections without guaranteeing delivery of outstanding requests or responses. The SPINNP_CLOSE_SESSION operation takes an enumerator argument to specify the manner in which connections are unbound in the session. Immediate session termination should only be used in the event of a failure where rapid recovery is needed, or in the event of an immediate need to remove a node from the cluster.

F. Batch Execution Ordering

The present invention is directed to a system and method for specifying batch execution ordering of requests in a cluster of nodes. The strict sequence numbering of requests in each channel provides a capability of defining the ordering of request execution within the channel. According to an aspect of the invention, the request id is extended to include a batch number that provides an execution ordering directive within a channel. That is, each request is also assigned a batch number used to impose ordering of execution the request within the channel. All requests with the same batch number in a channel can be executed in arbitrary order or concurrently by the responder. Any requests that have different batch numbers in the same channel are executed in order of ascending batch number. Illustratively, requests within different channels may be executed in an arbitrary order with respect to each other.

Any number of contiguous requests (i.e., requests with a contiguous set of sequence numbers) in a channel can be issued with the same batch number. Ordering is imposed only when the batch number changes, e.g., increases. Illustratively, the batch number increases monotonically in order of increasing sequence number, such that $B(s1)>=B(s2)$ if $s1>s2$ where s1 and s2 are sequence numbers and B(s) is the batch number of the request with sequence number s. Moreover, the batch number illustratively increases only in increments of one, e.g., either $B(n+1)=B(n)$ or $B(n+1)=(B(n)+1) \bmod 2^{32}$, where B(n) is the batch number of the nth request sent on a channel. Although more than one request in a channel can have the same batch number, all requests with the same batch number B are executed before any request with batch number B+1 or higher.

In the illustrative embodiment, the batch number is a 32-bit value, allowing window sizes to be effectively unlimited (maximum of $2^{32}-1$). The number of requests in a channel is generally limited to a sequence window size, with the outstanding requests having sequence numbers that fall within the range of the sequence window of each other. In addition, the magnitude of the batch numbers is large enough such that the numbers cannot wrap-around within the sequence window, i.e., bmax>seq_window. Nevertheless, the batch number can wrap-around independently of the sequence number. That is, batch numbers and sequence numbers can wrap-around independently in a binary numbering scheme.

Figure 7:
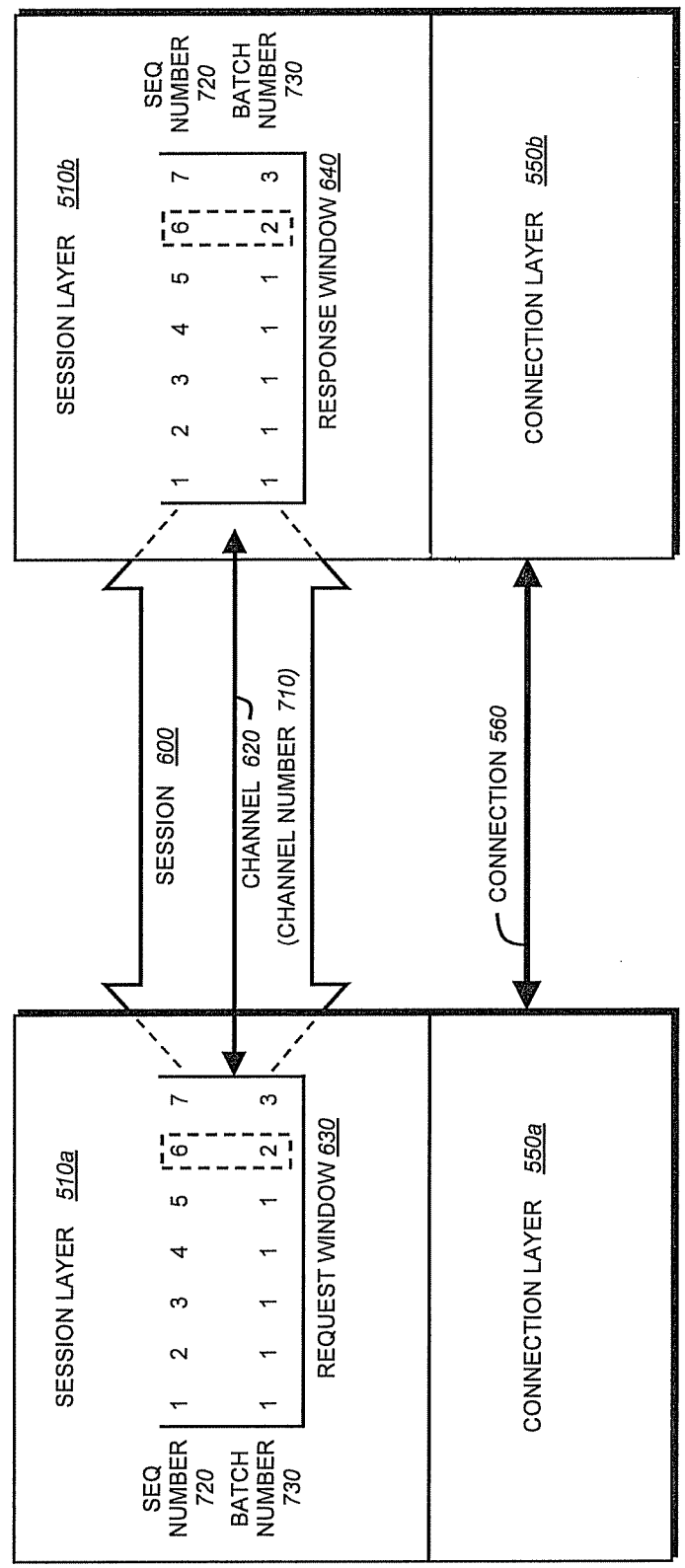
FIG. 7 is a schematic block diagram illustrating the use of batch numbers within a is channel of the session in accordance with the present invention.

FIG. 7 is a schematic block diagram illustrating the use of batch numbers within a channel of a session in accordance with the present invention. Each channel 620 is illustratively embodied as a request window 630 within the session layer 510a (e.g., at a requester blade/element) and a response window 640 within session layer 510b (e.g., at a responder blade/element). Each window 630, 640 has a sequence number range for storing outstanding requests sent over a connection 560; each request is identified by a unique request id 700:

Request ID 700=Channel Number 710+Sequence Number 720+Batch Number 730 wherein (i) the channel number 710 specifies the channel 620 over which the request is sent from, e.g., an N-blade 310 to a D-blade 350, (ii) the sequence (seq) number 720 specifies the sequence of that request within the channel and (iii) the batch number 730 specifies the ordering imposed on that request within the channel. The request (req) id 700 thus specifies the order in which requests are sent over the channel between the blades in the cluster.

As noted, requests (i.e., Req ID 700) having the same batch number 730 within a channel can be executed at a responder (e.g., D-blade 350) in any order. For example, requests with seq numbers 1-5 can be executed in any order because they are all associated with batch number 1. However, execution of each of those requests must be completed before the request with seq number 6 can be executed because the latter request is associated with a different batch number, e.g., batch number 2. Similarly, execution of the request with seq number 6 must be completed before the request with seq number 7 can be executed because that later request is associated with batch number 3.

According to another aspect of the invention, the responder does not execute a request associated with a different batch number until it identifies a transition or boundary between an immediately preceding batch number and a next batch number, and determines that all intervening requests associated with the preceding batch number have been completed. In this context, a "boundary" may be defined as the point at which the preceding seq number s in the preceding batch number B(n) moves to the next seq number s+1 in the next batch number B(n+1). A key to the operation of batch numbering is that boundaries between adjacent batches can be identified with complete certainty, since the sequence numbers 720 establish an exact order in which the requests are issued, regardless of their order of arrival at the responder. Once the first request in a batch is identified and all requests in the immediately preceding batch have been executed, any requests in the next (current) batch that have been received by the responder can be executed, even if the entire batch has not yet been seen. The responder maintains a current batch index, and any request arriving with that batch number can be dispatched immediately. Any request with a higher batch number is delayed until the transition from the previous batch number to the new batch number is observed in a pair of requests that have adjacent sequence numbers, and all requests in the previous batch have been received and processed.

Batch numbering can be used to achieve several different ordering behaviors within a channel. For example, a completely unordered set of requests can be sent on a channel by issuing all the requests with the same batch number. Such un-ordered behavior can extend indefinitely, although the number of outstanding requests at any one time is always limited by the size of the sequence window. In addition, a strictly ordered sequence of requests can be issued with strictly increasing batch numbers, incremented by one each time. Furthermore, a mixture of ordered and unordered operations can be sent on a channel. As an example, a requester may first lock a byte range of a file, then perform multiple unordered I/O operations to that byte range.

A common usage of batch execution ordering involves SCSI protocol processing, wherein barrier operations are inserted into a channel of requests that is otherwise unordered within arbitrarily large groups of requests. All operations occurring prior to the barrier must be completed before any operations after the barrier are executed. According to the invention, ordering can be achieved by incrementing the batch number when a barrier is encountered. Batch numbering of requests further allows the benefits of explicit request ordering controls, while also allowing request chaining (as in DAFS) without depending on in-order message delivery. This feature of the invention offers the benefits of NFSv4 compound without its extra layer of request encapsulation.

Figure 8:
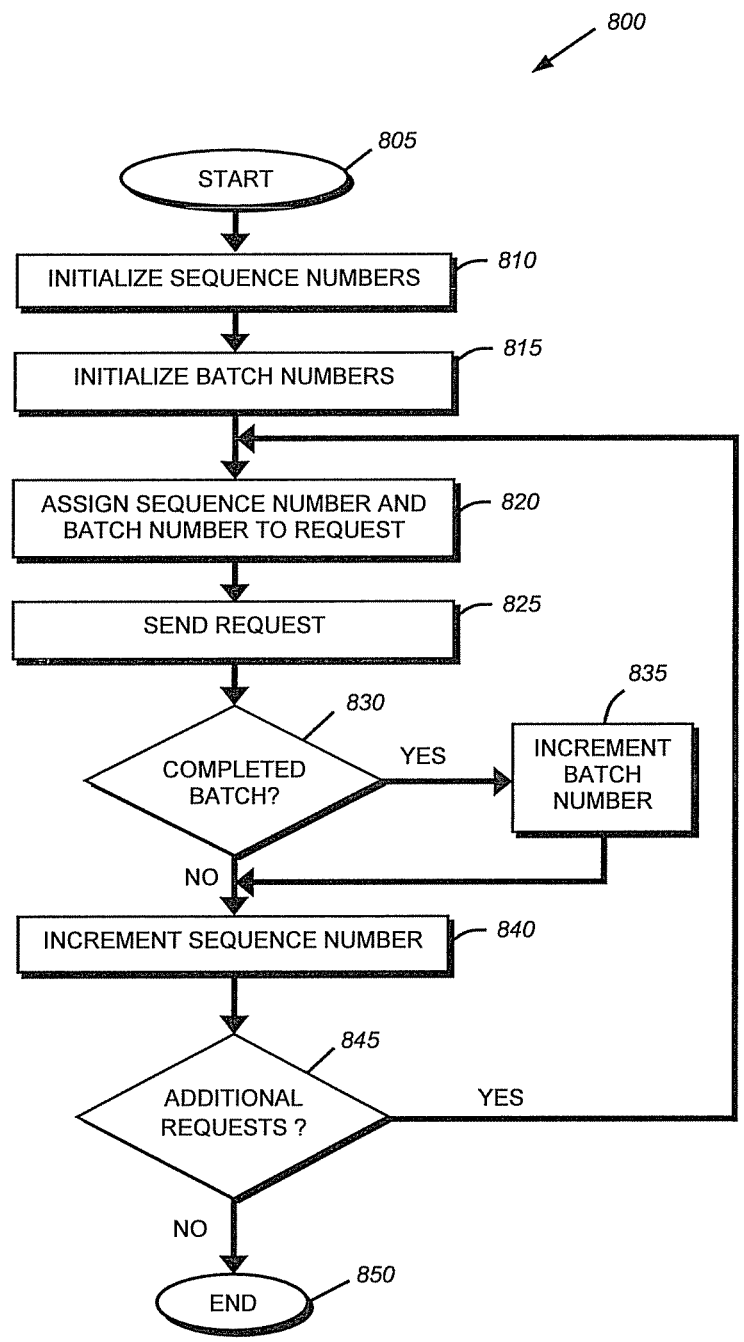
FIG. 8 is a flowchart illustrating a procedure for specifying batch execution ordering in accordance with the present invention.

FIG. 8 is a flowchart illustrating a procedure 800 for specifying batch execution ordering of requests in accordance with an embodiment the present invention. The procedure 800 illustrates the steps performed by a requestor originating a series of requests. The procedure starts in step 805 and continues to step 810 where requester initializes the sequence numbers to be utilized. Then, in step 815, the requester initializes the batch numbers to be utilized. This initialization of sequence and batch numbers may be accomplished by starting the sequence and batch numbers from predetermined values, e.g., zero. In step 820, a sequence number and a batch number are assigned to a request, is which is then sent to the destination (responder) in step 825. The requester then, in step 830, determines whether it has completed the current batch. If it has completed the current batch, the requester branches to step 835 and increments the batch number before continuing to step 840. However, if the batch has not been completed, the requester branches from step 830 to step 840. In step 840 the requestor increments the sequence number. The requester then determines in step 845, whether there are additional requests. If there are no additional requests, the procedure ends in step 850. However, if there are additional requests, the procedure branches back to step 820 and the next request is assigned the newly incremented sequence number and batch number.

Figure 9A:
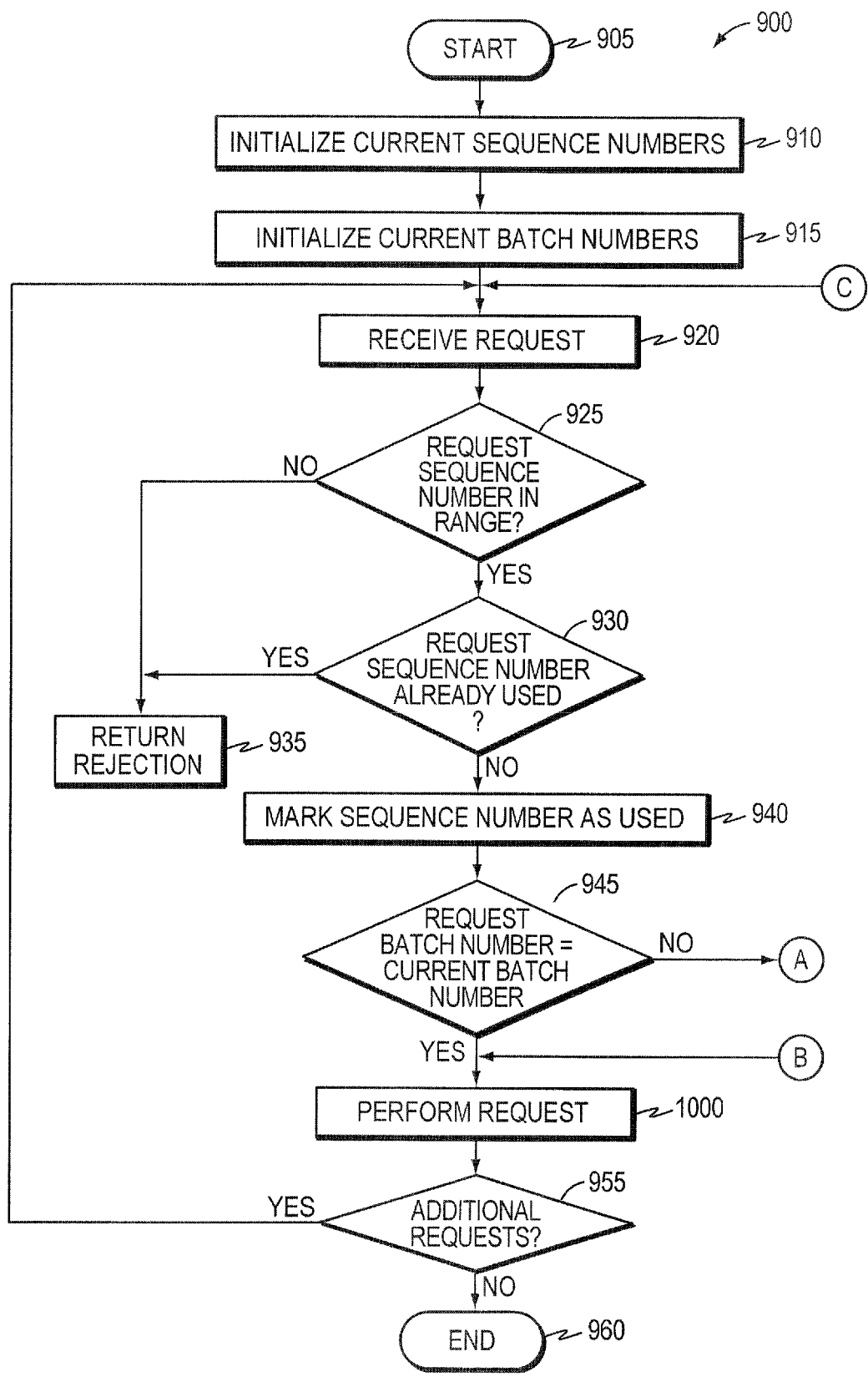
FIG. 9A is a flowchart illustrating a procedure for processing received batch execution ordered requests in accordance with the present invention.
Figure 9B:
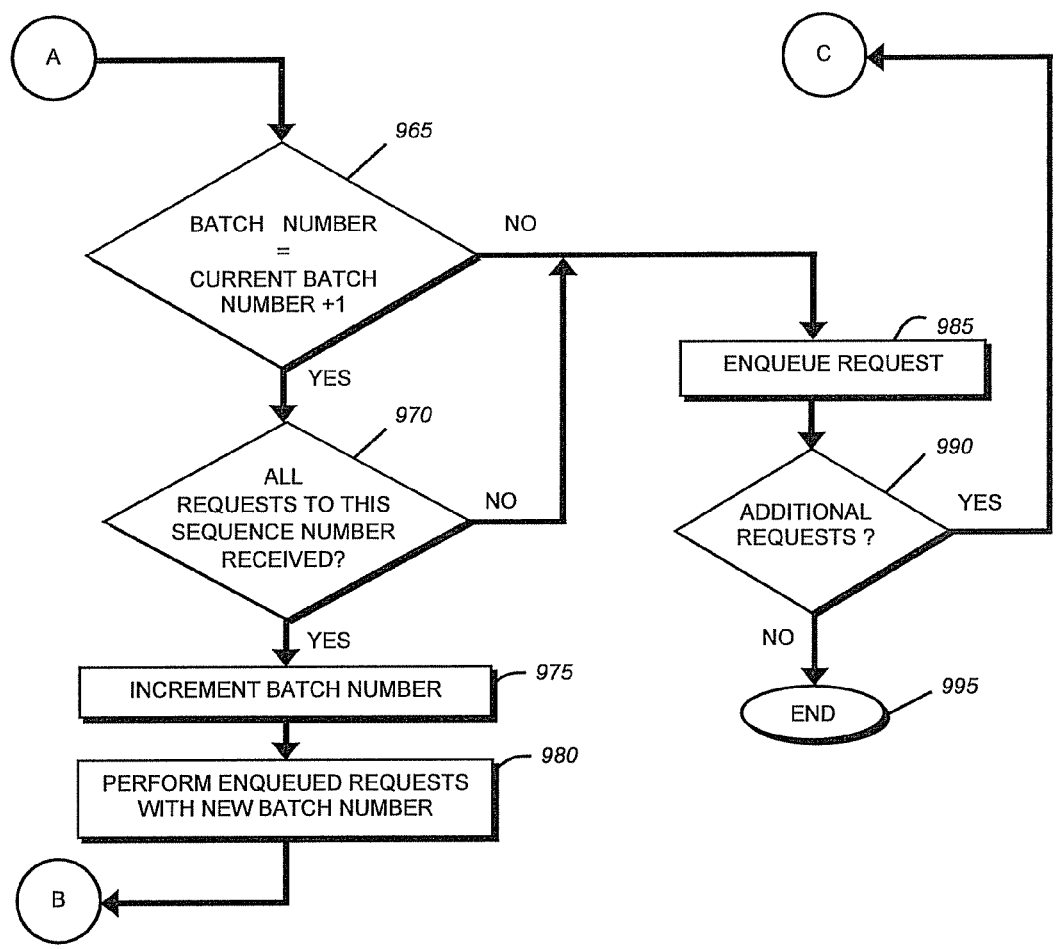
FIG. 9B is a flowchart illustrating a procedure for processing received batch execution ordered requests in accordance with the present invention.

FIGS. 9A and 9B are flowcharts illustrating a procedure 900 for processing received requests including batch numbers by a responder in accordance with an embodiment of the present invention. The procedure 900 begins in step 905 and proceeds to step 910 where the responder initializes the current sequence number. Then, in step 915, the responder initializes the current batch number. The responder then receives a request in step 920. In step 925, the responder determines if the sequence number of the request is within an acceptable range. The acceptable range is illustratively the window size. For example, if the window size is 10 and the current sequence number is 70, only those messages with sequence numbers 70-79 are within the window. If so, the responder then, in step 930 determines whether the request sequence number has already been utilized. If the answer is negative for step 925 or yes for step 930, the responder branches to step 935 and returns a rejection message.

However, if the sequence number is in the appropriate range and the sequence number has not previously been utilized, the responder then marks the sequence number as used in step 940. The responder then determines whether the batch number associated with request equals the current batch number. If the batch numbers match, the responder continues to step 1000 where the request is performed. Step 1000 is described in further detail below in reference to FIG. 10. Once the request is performed, the responder determines, in step 955, whether there are additional requests. If there are no additional requests, the procedure ends in step 960. However if, in step 955, it is determined that there are additional requests, the responder loops back to step 920 to receive the next request.

If, in step 945 it is determined that the batch number associated with the request does not equal the current batch number, the responder branches to step 965 where it determines if the request's batch number equals the current batch number plus one. If it does not, the requester branches to step 985, where the responder enqueues the request for later processing before determining, in step 990, whether additional requests. If there are no additional requests, the responder ends in step 995. However, if there are additional requests, the procedure loops back to step 920.

If in step 965 it is determined that the request's batch number equals the current batch number plus one, the responder continues to step 970, where a determination is made whether all requests up to the sequence number have been received. If so, the batch number is incremented in step 975 and all enqueued requests with the new batch number are performed in step 980. The responder then continues to step 1000 to perform the current request. If, in step 970 it is determined that all requests up to the sequence number have not been received, the responder branches to step 985 and enqueues the request as described above.

Figure 10:
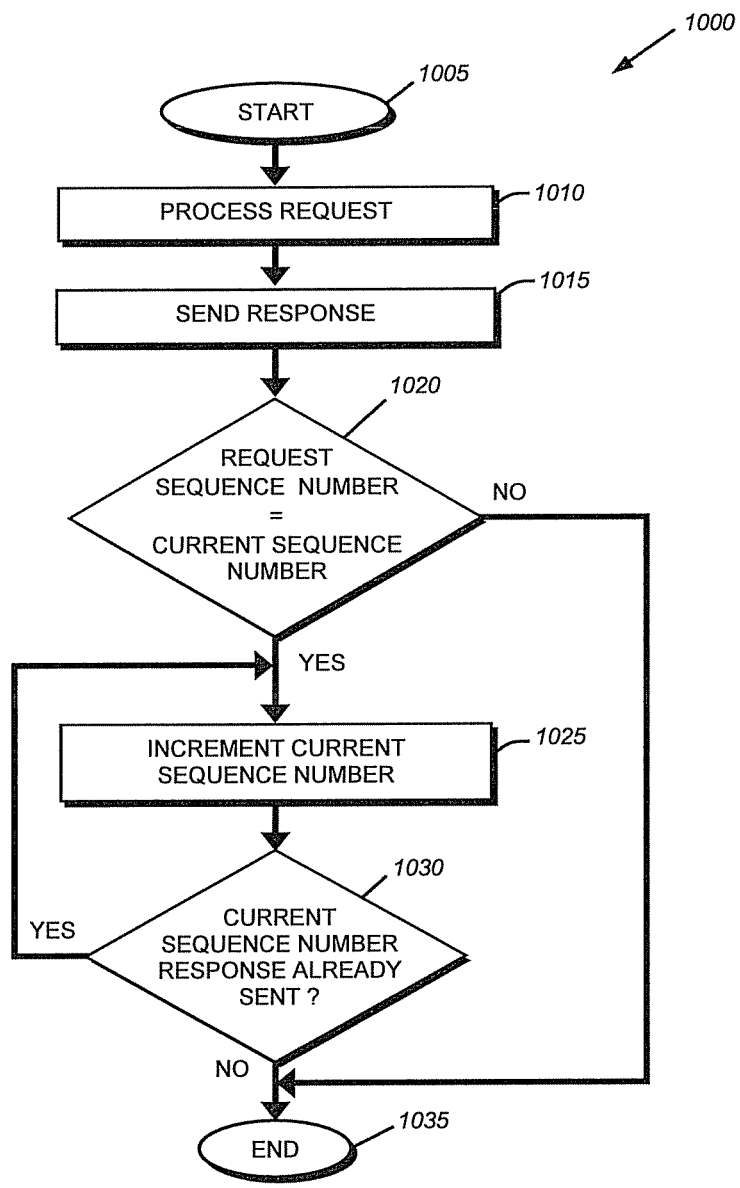
FIG. 10 is a flowchart illustrating a procedure for processing requests in accordance with the present invention.

FIG. 10 is a flowchart illustrating a procedure 1000 for performing the request in accordance with an embodiment the present invention. The procedure 1000 begins in step 1005 and continues to step 1010 where the request is processed. This may be accomplished by, for example, passing the operations to the file system for processing. The request's response is then sent in step 1015. The response may comprise a status indicator or, in the case of a read operation, the requested data. Then, in step 1020, a determination is made whether the request's sequence number equals the current sequence number. If they are not equal, the responder branches to step 1035 and ends. However if they are equal, the sequence window may then be propagated forward as the oldest sequence number has been processed. As such, the procedure then increments the current sequence number in step 1025 before deciding, in step 1030 whether the current sequence number has already had a response sent. if a response has not already been sent, the procedure then ends in step 1035. However, if a response has already been sent, the procedure loops back to step 1025 and further increments the current sequence number.

Advantageously, batch execution ordering allows multiple requests to be executed concurrently or out of sequence, while explicitly requiring ordering among subsets of requests. That is, the use of batch numbers within a channel allows imposition of an ordering constraint on requests in the channel, as well as issuance of multiple unordered requests in the channel. Layering of a batch number on a request ID allows immediate and certain detection of a boundary between batches with no danger of error. In other words, the batch number enables a responder to determine whether a request can be immediately executed or must be stalled, and this determination can always be made optimally based on the requests received at that point.

Moreover, batch numbering allows a client to specify a precise ordering of batches of requests of any size with respect to each other. This provides a solution to constraints imposed on network protocols by SCSI, NFS, CIFS and any arbitrary protocol that may require ordering of request execution, while retaining the benefits of flow control, resource constraining and immunity to long-running requests, provided by multiple channels and per-request sequence numbers with predetermined sequence windows. Strict ordering is possible simply by incrementing the batch number by one for every request sent. Complete unordered execution is possible by sending all requests with the same batch number. Any intermediate level of ordering is possible, including sending a stream of unordered requests with the knowledge that some future request may need to be ordered, but without knowing how many requests need to be issued before the request requiring ordering is issued.

Batch ordering further provides a substantial improvement over the ordering mechanism in NFS and improves upon the ordering mechanism in DAFS, while supporting the type of ordering needed to achieve an efficient implementation of SCSI in a client/server model. The novel ordering capability provided by the batch numbers is provided at little cost in either requester/responder endpoint of the session. Both endpoints maintain a current batch number and the responder enqueues requests that are from a higher batch than the current batch number. However, the number of such requests in a channel is limited by the sequence number window size.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades or elements, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes, layers and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for operating a computer data storage system, comprising:
   receiving a plurality of requests from a client, each request of the plurality of requests assigned a unique sequence number, and each request being an input/output request to a data storage device;
   dividing the plurality of requests into a plurality of subsets of requests;
   assigning each subset of requests a unique batch number;
   executing a first subset of requests having a first batch number in arbitrary order with respect to the sequence number of each request of the first subset of requests; and
   executing a second subset of requests having a second batch number in an arbitrary order with respect to the sequence number of each request of the second subset of requests after execution of all of the first subset of requests assigned the first batch number have completed, wherein executing the second subset of requests further comprises:
   receiving a particular request having a different batch number than the first batch number and the second batch number;
   in response to the different batch number of the particular request not being the second batch number plus one, enqueing the particular request;
   in response to the different batch number of the particular request being the second batch number plus one, determining whether all requests up to the sequence number associated with the particular request have been received;
   in response to all requests up to the sequence number associated with the particular request having been received, processing the particular request; and
   in response to all requests up to the sequence number associated with the particular request having not been received, enqueing the particular request.

2. The method as in claim 1, further comprising:
using an attached array of writable storage device media as the data storage device.

3. The method as in claim 1, further comprising:
using an optical storage device as the data storage device.

4. The method as in claim 1, further comprising:
using a magnetic tape as the data storage device.

5. The method as in claim 1, further comprising:
using a bubble memory as the data storage device.

6. The method as in claim 1, further comprising:
using an electronic memory as the data storage device.

7. The method as in claim 1, further comprising:
using a micro-electro mechanical device as the data storage device.

8. The method as in claim 1, further comprising:
using a media configured to store information as the data storage device.

9. A computer data storage system apparatus, comprising:
a processor configured to receive a plurality of requests from a client, each request of the plurality of requests assigned a unique sequence number, and each request being an input/output request to a data storage device;

an operating system configured to divide the plurality of requests into a plurality of subsets of requests;

the operating system further configured to assign each subset of requests a unique batch number;

the operating system further configured to execute a first subset of requests having a first batch number in arbitrary order with respect to the sequence number of each request, wherein execution of the first subset of requests further comprises:

(i) receiving a particular request having a different batch number than the first batch number, (ii) enqueuing the particular request in response to the different batch number of the particular request not being the first batch number plus one, (iii) determining whether all requests up to a sequence number associated with the particular request have been received in response to the different batch number of the particular request being the first batch number plus one, (iv) processing the particular request in response to all requests up to the sequence number associated with the particular request having been received, and (v) enqueuing the particular request in response to all requests up to the sequence number associated with the particular request having not been received.

10. The apparatus as in claim 9, further comprising:
an optical storage device used as the data storage device.

11. The apparatus as in claim 9, further comprising:
a magnetic tape used as the data storage device.

12. The apparatus as in claim 9, further comprising:
a bubble memory used as the data storage device.

13. The apparatus as in claim 9, further comprising:
an electronic memory used as the data storage device.

14. The apparatus as in claim 9, further comprising:
a micro-electro mechanical device used as the data storage device.

15. The apparatus as in claim 9, further comprising:
a media configured to store information used as the data storage device.

16. A computer data storage system apparatus, comprising:
a processor configured to receive a plurality of requests from a client, each request of the plurality of requests assigned a unique sequence number, and each request being an input/output request to a data storage device;

an operating system configured to divide the plurality of requests into a plurality of subsets of requests;

the operating system further configured to assign a unique batch number to each subset of requests;

the operating system further configured to execute a first subset of requests having a first batch number in arbitrary order with respect to the sequence number of each request of the first subset of requests; and the operating system further configured to execute a second subset of requests having a second batch number in arbitrary order with respect to the sequence number of each request of the second subset of requests after execution of all of the first subset of requests having the first batch number have completed, wherein execution of the second subset of requests further comprises:

receiving a particular request having a different batch number than the first batch number and the second batch number;

enqueuing the particular request in response to the different batch number of the particular request not being the second batch number plus one;

determining whether all requests up to the sequence number associated with the particular request have been received in response to the different batch number of the particular request being the second batch number plus one;

processing the particular request in response to all requests up to the sequence number associated with the particular request having been received; and enqueuing the particular request in response to all requests up to the sequence number associated with the particular request having not been received.

17. A computer data storage system apparatus, comprising:
a plurality of requests received from a client, each request of the plurality of requests assigned a unique sequence number, and each request being an input/output request to a data storage device;

a plurality of subsets of requests formed by dividing the plurality of requests into subsets;

a unique batch number assigned to each subset of requests; and a processor configured to execute a first subset of requests having a first batch number in arbitrary order with respect to the sequence number of each request of the first subset of requests, wherein execution of the first subset of requests, further comprises:

(i) receiving a particular request having a different batch number than the first batch number, (ii) enqueuing the particular request in response to the different batch number of the particular request not being the first batch number plus one, (iii) determining whether all requests up to the sequence number associated with the particular request have been received in response to the different batch number of the particular request being the first batch number plus one, (iv) processing the particular request in response to all requests up to the sequence number associated with the particular request having been received, and (v) enqueuing the particular request in response to all requests up to the sequence number associated with the particular request having not been received.

18. A method for operating a computer data storage system, comprising:
receiving a plurality of requests from a client, each request of the plurality of requests assigned a unique sequence number, and each request being an input/output request to a data storage device;

dividing the plurality of requests into a plurality of subsets of requests;

assigning a unique batch number to each subset of requests so that each subset of requests is assigned a unique batch number; and executing a first subset of requests having a first batch number and ignoring the sequence number when executing the requests having the first batch number, wherein executing the first subset of requests, further comprises:

receiving a particular request having a different batch number than the first batch number;

in response to the different batch number of the particular request not being the first batch number plus one, enqueing the particular request;

in response to the different batch number of the particular request being the first batch number plus one, determining whether all requests up to the sequence number associated with the particular request have been received;

in response to all requests up to the sequence number associated with the particular request having been received, processing the particular request; and in response to all requests up to the sequence number associated with the particular request having not been received, enqueing the particular request.

19. A computer readable medium containing executable program instructions executed by a processor, comprising:

program instructions that receive a plurality of requests from a client, each request of the plurality of requests assigned a unique sequence number, and each request being an input/output request to a data storage device;

program instructions that divide the plurality of requests into a plurality of subsets of requests;

program instructions that assign a unique batch number to each subset of requests so that each subset of requests is assigned a unique batch number;

program instructions that execute a first subset of requests having a first batch number in arbitrary order with respect to the sequence number of each request of the first subset of requests; and program instructions that execute a second subset of requests having a second batch number in arbitrary order with respect to the sequence number of each request of the second subset of requests, after execution of all of the first subset of requests, having the first batch number, have completed, wherein the program instructions that execute the second subset of requests further comprises:

program instructions that receive a particular request that has a different batch number than the first batch number and the second batch number;

program instructions that enqueue the particular request in response to the different batch number of the particular request not being the second batch number plus one;

program instructions that determine whether all requests up to the sequence number associated with the particular request have been received in response to the different batch number of the particular request being the second batch number plus one;

program instructions that process the particular request in response to all requests up to the sequence number associated with the particular request having been received; and program instructions that enqueue the particular request in response to all requests up to the sequence number associated with the particular request having not been received.

* * * * *

UNITED STATES PATENT AND TRADEMARK OFFICE
CERTIFICATE OF CORRECTION

| | | |
|---|---|---|
| PATENT NO. | : 8,762,416 B1 | Page 1 of 2 |
| APPLICATION NO. | : 12/637926 | |
| DATED | : June 24, 2014 | |
| INVENTOR(S) | : Peter F. Corbett | |

It is certified that error appears in the above-identified patent and that said Letters Patent is hereby corrected as shown below:

In the Specification:
Col. 1, line 66:
~~ties are typically is software programs executing on the nodes.~~ should read
ties are typically software programs executing on the nodes.

Col. 2, line 43:
~~nection is between those processes that indicate a willingness~~ should read
nection between those processes that indicate a willingness Col. 3, line 60:
~~batch execution ordering of requests in a cluster of is storage~~ should read
batch execution ordering of requests in a cluster of storage Col. 5, line 5:
~~batch numbers within a is channel of the session in accor-~~ should read
batch numbers within a channel of the session in accor- Col. 8, line 39:
~~SCSI target module 335 is generally disco posed between the~~ should read
SCSI target module 335 is generally disposed between the Col. 8, line 46:
~~for use in access to the information stored on the stores age~~ should read
for use in access to the information stored on the storage Col. 8, line 52:
~~minoring and/or parity (RAID). The file system 360 illustra-~~ should read
mirroring and/or parity (RAID). The file system 360 illustra- Signed and Sealed this
Thirtieth Day of September, 2014

Michelle K. Lee
*Deputy Director of the United States Patent and Trademark Office*

CERTIFICATE OF CORRECTION (continued)

U.S. Pat. No. 8,762,416 B1

Col. 8, line 56:
~~byte (kB) blocks and using index nodes ("modes") to identify~~ should read
byte (kB) blocks and using index nodes ("inodes") to identify Col. 10, line 36:
~~port of an N-blade that receives a client is request can access~~ should read
port of an N-blade that receives a client request can access Col. 11, line 11:
~~of with the present invention. The SpinNP mesas sage 400 is~~ should read
of with the present invention. The SpinNP message 400 is Col. 14, line 37:
~~prevents reexecution of replayed or duplicated requests, and~~ should read
prevents re-execution of replayed or duplicated requests, and Col. 17, line 62:
~~number are assigned to a request, is which is then sent to the~~ should read
number are assigned to a request, which is then sent to the